United States Patent [19]

Seko et al.

[11] 4,288,968

[45] Sep. 15, 1981

[54] END SEALING DEVICE FOR A PLASTIC FILM IN A PACKAGING APPARATUS

[75] Inventors: Kiyoshi Seko, Nagoya; Mamoru Ichikawa, Aichi, both of Japan

[73] Assignees: Fuji Machinery Co., Ltd.; Japan Packaging Machinery Manu. Assn., both of Japan; part interest to each

[21] Appl. No.: 99,847

[22] Filed: Dec. 3, 1979

[51] Int. Cl.$^3$ .................. B65B 51/30; B65B 51/28; B65B 9/06
[52] U.S. Cl. ........................... 53/550; 53/373; 53/552; 156/583.1; 219/326
[58] Field of Search ............ 219/253, 301, 302, 304, 219/326, 328, 283; 53/373, 550, 553, 551, 552, 554, 555; 156/582, 583.1

[56] References Cited

U.S. PATENT DOCUMENTS

| 2,803,100 | 8/1957 | Aalseth | 53/550 X |
| 2,882,662 | 4/1959 | Campbell | 53/550 |
| 3,198,683 | 8/1965 | Lee | 53/373 X |
| 3,298,430 | 1/1967 | Kodaira | 219/326 X |
| 3,388,526 | 6/1968 | Harm et al. | 53/550 X |
| 3,585,623 | 6/1971 | Laukaitis | 53/550 X |
| 3,603,767 | 9/1971 | Scicchitano | 219/326 X |
| 3,677,329 | 7/1972 | Kirkpatrick | 219/326 X |
| 3,728,518 | 4/1973 | Kodaira | 219/326 |
| 3,902,046 | 8/1975 | Oi | 219/326 X |
| 3,943,686 | 3/1976 | Crawford et al. | 53/373 |

Primary Examiner—Horace M. Culver
Attorney, Agent, or Firm—John E. Benoit

[57] ABSTRACT

A heat sealing device in a packaging apparatus utilizing a plastic film for continuously seal both ends of a plurality of cylindrical bags made from the plastic film. The device comprises a pair of heat sealing members provided separatably and oppositely against each end portion of each cylindrical bag which is to be sealed transversely across the film. Each heat sealing member has a heat sealing surface which is to be pressed against the film and at least a pair of sealed chambers inside the heat sealing surface containing working liquid as a heat medium. A heat source is provided to heat at least a portion of the sealed chamber so that the working liquid generates vaporized gas by the heat. The sealed chamber is controlled to be kept at a pressure and a temperature so that the vaporized gas is condensed substantially at a temperature under which the film is sealed.

6 Claims, 8 Drawing Figures

END SEALING DEVICE FOR A PLASTIC FILM IN A PACKAGING APPARATUS

BACKGROUND OF THE INVENTION

1. Field of the Invention

The present invention relates to an end sealing device to be applied to a continuous packaging apparatus for wrapping products by a plastic film substantially in pillow forms. The end sealing device is utilized to seal by heat each cylindrical bag wrapping the product at two portions perpendicular to its axis.

2. Description of the Prior Art

In a conventional sealing device applied to such a packaging device, a heat sealing member of rotary or reciprocative type is provided across the feeding path of the cylindrical bags. However, since the heat sealing member is directly heated by an electric heater in such a device, the temperature on its sealing surface tends to vary in portion and in time and cannot be kept uniform depending on the quality and the form of the sealing member and the type and efficiency of the electrical system regarding the electric heater, leading to uneven sealing of the film and to various defects caused by inferior sealing of the film.

SUMMARY OF THE INVENTION

The present invention provides an improved heat sealing device which can overcome the aforementioned disadvantages of the prior art by employing a novel construction in which working fluid contained in a plurality of sealed chambers formed in the heat sealing member is heated to generate vaporized gas which functions as a heat medium to uniformly heat the heat sealing surface and keep the same at a predetermined temperature.

An object of the present invention is to provide a heat sealing device in a continuous packaging apparatus which can effectively seal both ends of each wrapping film while uniformly heating the heat sealing surface of a heat sealing member and maintaining the same at a predetermined temperature.

Another object of the present invention is to provide a heat sealing device which can immediately compensate lowering of the heat on the heat sealing surface utilizing latent heat in gasification and condensation of working liquid contained in the heat sealing member.

Still another object of the present invention is to facilitate temperature control of an electric heater which functions as a heat source by utilizing working liquid condensable substantially at a temperature under which the film is fused in a sealed condition as a heat medium for the heat sealing surface.

A further object of the present invention is to simplify construction and manufacture of the heat sealing member by inserting a compact tubular member containing the working liquid into the heat sealing member as a jacket.

DESCRIPTION OF THE PREFERRED EMBODIMENT

Before describing the invention in further detail, it is to be noted that the end sealing device according to the present invention can be applied to both horizontal and vertical continuous packaging apparatuses.

Figure 1:
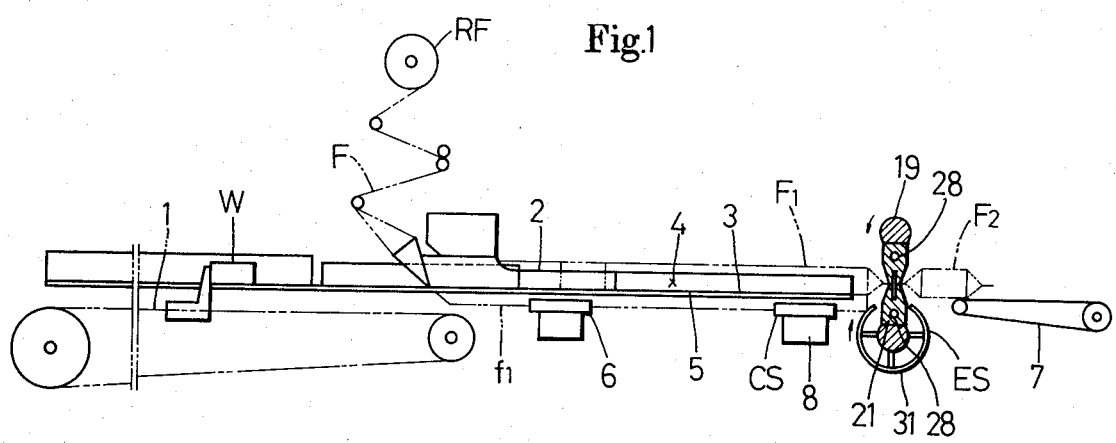
FIG. 1 is a diagramatic front elevational view of a packaging apparatus.
Figure 6:
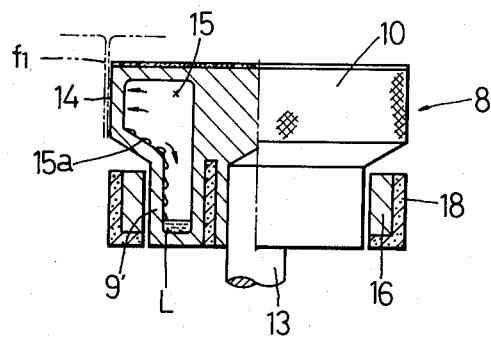
FIG. 6 is a partial cross sectional view showing another embodiment of the center sealing device.

FIG. 1 illustrates a horizontal packaging apparatus to which the end sealing device according to the present invention and a center sealing device are applied. In this packaging apparatus, products to be wrapped W are carried by a conveyer at a constant speed while a long film F continuously supplied from a roll of film RF passes through a bag making device 2 and is tucked in a cylindrical form to substantially wrap the product W in a cylindrical film F1. The product W and the cylindrical film F1 are conveyed in a channel-shaped feeding path 4 defined by a pair of feeding beds 3, and during this conveyance, the cylindrical film F1 is continuously sealed in the axial direction by a center sealing device CS. Then the end sealing device ES of the present invention seals the cylindrical film F1 at two portions perpendicular to the axial direction during every pressurizing operation and severs the centers of the sealed portions to form a completely sealed pillow-shaped bag F2 which is brought out from the packaging apparatus by another conveyer 7.

Under the feeding beds 3, there are provided a pair of feed rollers 6 which are identical with each other in diameter and adjacently rotated with respect to the center line of a guide channel 5 formed between the inner surfaces of the feeding beds 3 along the direction of conveyance. The shafts of the feed rollers 6 are linked with each other by an appropriate means such as gearing so that the feed rollers 6 are continuously rotated following the operational condition of the apparatus to continuously feed the cylindrical films F1 within the feeding path 4 holding therebetween lapped axial ends f1 of the cylindrical film F1 which are extending downwardly from the guide channel 5 for sealing by the center sealing device CS.

Figure 2:
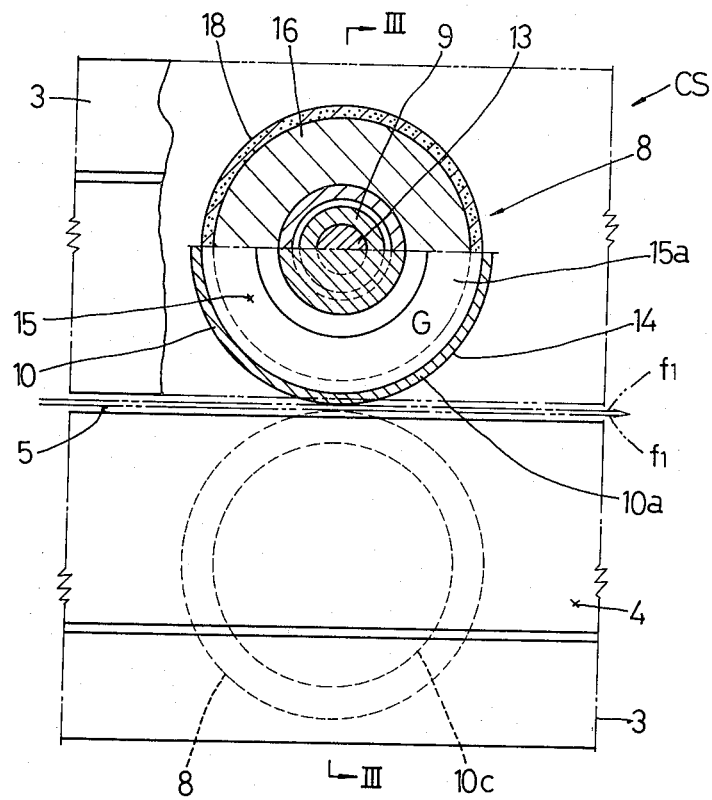
FIG. 2 is an enlarged partial fragmentary top plan view showing an embodiment of the center sealing device.
Figure 3:
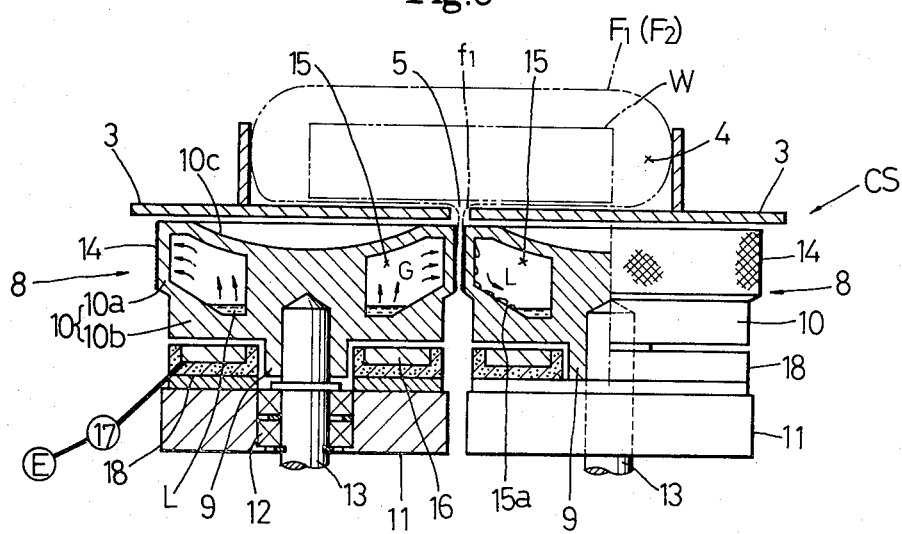
FIG. 3 is a cross sectional view taken along the lines III—III in FIG. 2.

As shown in FIGS. 2 and 3, the center sealing device CS has a pair of heating roller means 8 which are identical with each other and are placed under the feeding beds 3 forwardly of the feed rollers 6, i.e., in the right hand direction in FIG. 1. Each of the heating roller means 8 comprises a small-diametrical hub 9 and a stepped roller member 10 formed thereon, and is supported through a bearing 12 by a bearing holder 11 and disengageably fitted with a rotating shaft 13 linked by a means such as gearing with another rotating shaft 13 fitted with the other heating roller means 8. By virtue of this, heating surfaces 14 formed in the outer peripheries of large-diametrical portions 10a of the roller members 10 are continuously rotated by an appropriate driving means (not shown) at the same circumferential speed with that of the feed rollers 6 in contact with each other to seal the lapped axial ends f1 of the cylindrical film F1 held therebetween.

The roller member 10 of each of the heating roller means 8 is in the form of a thin cylindrical barrel sealingly having an annular chamber 15 therewithin, and the annular chamber 15 contains under vacuum a proper volume of working liquid L which generates condensable gas as a heat medium. As shown in FIG. 3, the bottom surface 15a of the annular chamber 15 is inwardly and downwardly inclined so that the condensed working liquid is immediately returned to the bottom of the annular chamber 15. The upper surface 10c of the roller member 10 is formed concavely so that enough space is left between the same and the lower surfaces of the feeding beds 3 to reduce heat transmission toward the feeding beds 3. Each heating roller means 8 is movable with the bearing holder 11, and is driven to move between a sealing position and a non-sealing position by operation of an electromagnetic solenoid (not shown) which is timed to start and stop the packaging apparatus.

As shown in FIG. 3, a ring-shaped electric heater 16 connected to an electric source E and controlled at a predetermined temperature by a voltage regulator 17 is provided in each heating roller means 8 for heating the working liquid L. The electric heater 16 is mounted on the upper surface of the bearing holder 11 through a heat insulating material 18 to face the lower surface of a small diametrical portion 10b of the roller member 10 and directly heat the same. The electric heater 16 can on the other hand be assembled into the small diametrical portion 10b of the roller member 10.

Figure 4:
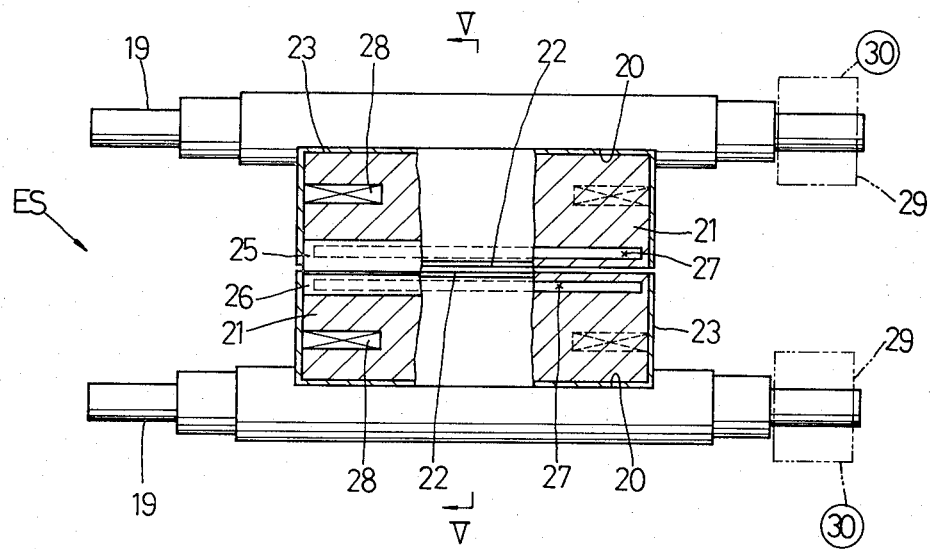
FIG. 4 is a partial fragmentary side elevational view showing an embodiment of the end sealing device according to the present invention.
Figure 5:
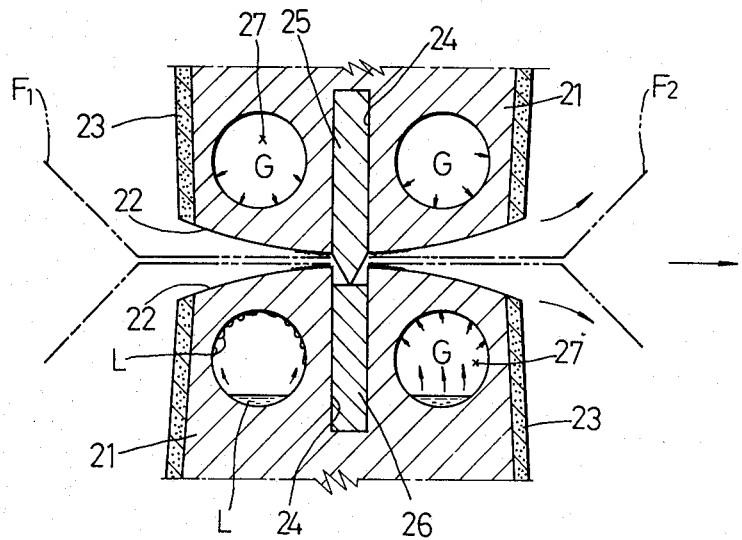
FIG. 5 is a cross sectional view taken along the lines V—V in FIG. 4.

Attention is now drawn to FIGS. 4 and 5 in which the end sealing device ES according to the present invention is shown in detail. As shown in FIGS. 4 and 5, a pair of heat sealing members 21 each in the form of a trapezoidal block are vertically placed beyond the feeding beds 3 transversely across the cylindrical film F1.

Each of the heat sealing members 21 has in its tapered free end an arcuate sealing surface 22 which is rather longer in width than the cylindrical film F1. Both heat sealing members 21 are entirely coated by heat insulating materials 23 except the sealing surfaces 22, and linked with each other by an appropriate means such as gearing to be symmetrically rotated, and are fixed by appropriate means such as bolts to seats 20 provided in parts of peripheries of upper and lower rotating shafts 19.

A pair of longitudinal grooves 24 are formed in the centers of the sealing surfaces 22, and a knife 25 is inserted in the upper groove 24 and a knife seat 26 for receiving the knife 25 is inserted in the lower groove 24. Returning to FIG. 1, numeral 31 indicates a guide ring mounted to the lower rotating shaft 19, which supports the cylindrical film F1 wrapping the product W to forwardly move them.

A pair of cylindrical chambers 27 are sealedly formed in each sealing member 21 on both sides of the groove 24 longitudinally along the sealing surface 22, and contain under vacuum working liquid L for generating condensable gas as a heat medium for the sealing surface 22. The cylindrical chamber 27 may be a hole passing longitudinally through the sealing member 21, which is sealed at both ends. A cartridge heater 28 is inserted into the base of each sealing member 21 for heating the working liquid L, and is connected to an electric source (not shown) through a conductive brush 29 mounted to the end of each rotating shaft 19. Cartridge heater 28 is maintained at a predetermined temperature by a voltage regulator 30.

The working liquid L to be contained in the chambers 15 and 27 in the sealing devices CS and ES is a fluid which can easily be kept at an appropriate temperature for sealing the film F made of various kinds of soft plastics and is stable within a temperature range of 5° C. to 230° C. For example, water is very useful as the working liquid L. Further, main portions of the heating roller means 8 and the sealing member 21 are made of copper or stainless steel depending on the characteristics of the working liquid L, and the heating surface 14 and the sealing surface 22 are preferably coated by non-adhesive material such as Teflon so that the film F is easily separated therefrom after sealing. The working liquid L may be introduced into the chambers 15 and 27 in a gaseous form.

In the packaging apparatus of the aforementioned construction, each electric heater 16 in the center sealing device CS which is kept at an appropriate temperature through the voltage regulator 17 heats the roller member 10 of the heating roller means 8 so that the working liquid L contained in the bottom of the chamber 15 evaporates by the heat of vaporization accompanied by pressure rising in the constant volume chamber to generate high-temperature condensable gas G, which fills the chamber 15. The heat of the condensable gas G is transferred from the inner wall of the chamber 15 uniformly to the heating surface 14 so as to entirely heat the roller member 10a at an appropriate temperature. Also in the end sealing device ES, the working liquid L in the chamber 27 is heated by the electric heater 28 in each sealing member 21 to generate high-temperature condensable gas G so that the sealing surface 22 is kept at an appropriate temperature by the heat of the condensable gas G. Thus, the heating surface 14 and the sealing surface 22 are uniformly heated in a short time and entirely maintained at an appropriate temperature for sealing the film F by heat. It is to be noted that the device according to the present invention is set at an appropriate temperature in a very short time, i.e., about 2 or 3 minutes. This is under one-sixth of that of a conventional device as compared under the same condition.

In operation, the axial ends f1 of the cylindrical film F1 are guided in the center sealing device CS naturally held between the heating surfaces 14 of the heating roller means 8 and heated at a predetermined temperature so that the lapped ends f1 are satisfactorily fused and pressed against each other so as to be continuously sealed by heat. Then, in the end sealing device ES, the cylindrical film F1 is held naturally between the sealing surfaces 22 in full width at the two portions perpendicular to the axis and heated so that the two portions are sealed by heat and simultaneously severed at the centers thereof by engagement of the knife 25 and the knife seat 26. Thus, sealing operation of the center portion and the end portions of the cylindrical film F1 can efficiently follow the high-speed operation of the packaging apparatus, and is uniformly and accurately repeated.

When the temperature of the sealing surfaces 22 is lowered because of heat absorption by the cylindrical film F1 or heat radiation during operation, part of the condensable gas G in the chambers 27 is condensed to generate latent heat and immediately prevent lowering of the temperature. The condensed liquid is heated by the electric heater 28 to be gasified again so that sufficient amount of heat is always transferred in the vicinity of the sealing surfaces 22 by circulation of gas and liquid to keep the sealing surfaces 22 at a predetermined high temperature.

In the sealing device according to the present invention, the chambers 27 always contain the liquid phase L and the gaseous phase G of the working fluid, and the electric heater 28 is controlled by the voltage regulator 30 to maintain the working fluid substantially within a predetermined temperature range. Since the temperature of the sealing surfaces 22 is rapidly controlled by the working fluid, the electric heater 28 need not be so strictly controlled.

In the end sealing device ES according to the present invention, various kinds of films including thick and thin films can be effectively sealed by heat since the quantity of evaporation of the working fluid is controlled only by temperature control of the electric heater 28 to determine the pressure and the temperature in the chamber 27 at any desired degree. Further, since the whole surface of the end sealing device ES except the sealing surfaces 22 of the sealing members 21 is covered by the heat insulating material 23 to positively prevent heat loss, the thermal capacity of the electric heater 28 for heating the working liquid L can be minimized.

Figure 7:
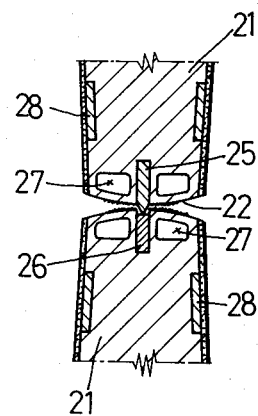
FIGS. 7 and 8 are cross sectional views showing another embodiments of the end sealing device respectively.

The construction of the sealing members 21 can be simplified as shown in FIG. 7 in which the electric heaters 28 are provided in the outer ends of the sealing members 21 with respect to the chambers 27 formed on both sides of the knife 25 and the knife seat 26 respectively.

The end sealing device ES according to the present invention can easily be applied to a vertical type packaging apparatus by mounting the sealing members 21 to rotating shafts in a proper direction.

Figure 8:
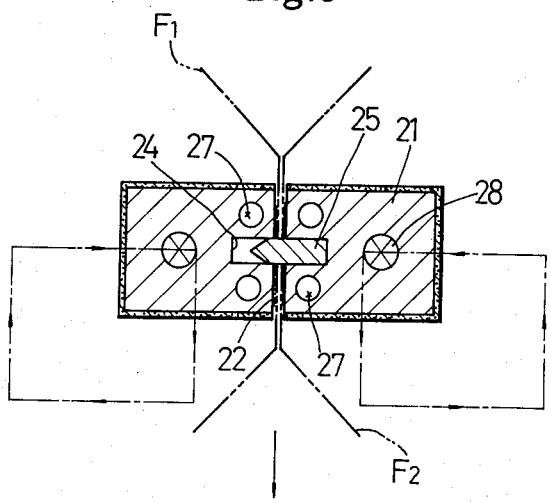

When substitution by a rectilinear motion type is desired, the sealing members 21 can be placed in a vertically spaced relation to move against each other, or a box motion form can be employed in which the sealing members 21 move vertically and horizontally in a cycle as shown in phantom lines in FIG. 8. In either case, the chamber 27 can be padded by a fibrous material such as metal or glass capable of effectively returning the condensed working liquid L by capillarity, which is to be filled by the working liquid L. The padding material is interposed between a portion for receiving heat from the heat source and a portion for radiating the heat. The chamber 27 is not necessarily formed to be circular in cross section, but can be quadrilateral in section, into which a tubular member containing the working liquid L is sealingly inserted. Further, the means for severing the sealed portions can be omitted from the end sealing devices ES if not necessary.

As hereinabove described, heat transfer in the sealing member of the device according to the present invention is rapid in comparison with that of the conventional device utilizing an electric heater only and the temperature of the sealing surface can be raised to the predetermined degree in a very short time so that the sealing operation is immediately started, leading to reduction of suspension time of the packaging apparatus therefor and improvement in operation efficiency.

Especially in the device according to the present invention, the heat source can easily be provided in, for example, an end of the sealing member since the sealed chamber containing the working liquid is provided in the full length of the sealing member and the means for heating the working liquid sufficiently serves in a portion of the sealed chamber. Further, even when only a portion of the sealing surface, e.g., the longitudinal center thereof is utilized, it can effectively seal the film maintaining the proper temperature.

While the invention has been described with reference to a preferred embodiment thereof, it is to be understood that modifications or variations may be easily made without departing from the scope of this invention which is defined by the appended claims.

What is claimed is:

1. In an end sealing device for a packaging apparatus including a pair of heat sealing members placed on a feeding path of a continuous cylindrical film spacedly containing products and capable of being sealed by heat, said heat sealing members holding said film therebetween for successively sealing ends of every two adjacent packages by heat, said heat sealing members comprising:

heat sealing surfaces for sealing said ends of every two adjacent packages and being longer in width than said cylindrical film;
   a sealed chamber provided in each of said heat sealing members adjacent said heat sealing surface along substantially the entire length thereof, said sealed chamber being maintained at a reduced pressure;
   a heat source provided within said heat sealing member; and
   a heat transferring working liquid sealedly introduced into said sealed chamber so as to partially fill said chamber, said liquid being heated by said heat source to generate a high temperature condensable gas, said condensable gas of said working liquid being condensed in the inner wall surface of said sealed chamber nearest said heat sealing surface contacting said film so as to discharge condensed latent heat for maintaining the entire heat sealing surface at a substantially constant temperature.

2. The apparatus of claim 1 wherein said heat source for said working liquid is a cartridge heater having an electric heating wire mounted in said heat sealing members at a distance from said heat sealing surfaces greater than said sealed chamber; and further comprising
   a voltage regulator for controlling the temperature of said cartridge heater.

3. The invention as defined in claim 1 wherein said sealed chamber comprises a straight through aperture in the longitudinal direction of each of said heat sealing members, and a sealed cylindrical member replaceably inserted into said aperture.

4. The invention as defined in claim 1 further comprising a knife and a knife seat in said heat sealing members adjacent the feed path of said film and extending transversely across said film for severing said film, said knife and said knife seat separately provided in opposed heat sealing members, and wherein said sealed chambers are located adjacent said knife and said knife seat.

5. The invention as defined in claim 1 further comprising a pair of parallel shafts synchronizedly rotating with each other and attached to opposed sealing surfaces for pressing said heat sealing surfaces in a direction perpendicular to said shafts against a portion of said cylindrical film for every rotation of said shafts so as to intermittently seal both ends of said bags by heat.

6. The invention as defined in claim 1 wherein said pair of heat sealing members are connected to a driving means so as to synchronizedly repeat a box motion substantially linearly moving in the steps of approaching each of said cylindrical bags from both sides of said film, forwardly moving with said film while holding said film therebetween for sealing the same by heat, separating from said film, and moving back to the original positions respectively.

* * * * *